US012592103B2

(12) United States Patent
Raikar et al.

(10) Patent No.: US 12,592,103 B2
(45) Date of Patent: Mar. 31, 2026

(54) SYSTEM AND METHOD FOR COMMUNICATING DRIVING INTENT OF AN AUTONOMOUS VEHICLE

(71) Applicant: Torc Robotics, Inc., Blacksburg, VA (US)

(72) Inventors: Akshay Pai Raikar, Blacksburg, VA (US); Joseph R. Fox-Rabinovitz, Blacksburg, VA (US); William Davis, Blacksburg, VA (US); Dakota James Hebert, Blacksburg, VA (US); Justin Yurkanin, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 329 days.

(21) Appl. No.: 18/535,454

(22) Filed: Dec. 11, 2023

(65) Prior Publication Data

US 2025/0191411 A1     Jun. 12, 2025

(51) Int. Cl.
| | |
|---|---|
| *G08G 1/052* | (2006.01) |
| *B60W 60/00* | (2020.01) |
| *G07C 5/00* | (2006.01) |
| *G08G 1/054* | (2006.01) |

(52) U.S. Cl.
CPC .......... *G07C 5/008* (2013.01); *B60W 60/001* (2020.02); *B60W 2510/0638* (2013.01); *B60W 2554/4045* (2020.02)

(58) Field of Classification Search
CPC ................ G07C 5/008; B60W 60/001; B60W 2554/4045; B60W 2510/0638
See application file for complete search history.

(56) References Cited

U.S. PATENT DOCUMENTS

| | | | | |
|---|---|---|---|---|
| 6,115,652 | A * | 9/2000 | Sato .................... | B60W 60/001 701/28 |
| 9,551,591 | B2 * | 1/2017 | Bodake ................ | G01C 21/367 |
| 9,969,329 | B2 * | 5/2018 | Shenoy ................ | G08G 1/0112 |
| 10,019,898 | B2 * | 7/2018 | Miller ...................... | G08G 1/08 |
| 10,098,014 | B1 * | 10/2018 | Shimizu .................. | H04W 4/80 |
| 10,235,122 | B1 * | 3/2019 | Goel ...................... | G06F 3/1423 |
| 10,449,967 | B1 * | 10/2019 | Ferguson ............. | G08G 1/0129 |
| 10,488,868 | B2 * | 11/2019 | Averhart ............ | G01C 21/3453 |
| 10,521,991 | B1 * | 12/2019 | Cameron ........... | G07C 9/00174 |
| 10,588,009 | B2 * | 3/2020 | Bansal .................... | H04L 67/12 |

(Continued)

*Primary Examiner* — Quang Pham
(74) *Attorney, Agent, or Firm* — Armstrong Teasdale LLP

(57) ABSTRACT

A vehicle including a vehicle wireless communication equipment, and an indicium for connecting to the vehicle wireless communication equipment displayed on a body of the vehicle is disclosed. The indicium includes information to connect with the vehicle wireless communication equipment. The vehicle wireless communication equipment is configured to broadcast a network identifier of the vehicle wireless communication equipment, and receive a request, from a third-party client device, to connect with the vehicle wireless communication equipment based upon the broadcasted network identifier or the indicium for connecting to the vehicle wireless communication equipment. The vehicle wireless communication equipment is configured to establish a session with the third-party client device in response to the received request, and transmit, to the third-party client device, infotainment information over the established session.

20 Claims, 3 Drawing Sheets

(56) References Cited

U.S. PATENT DOCUMENTS

| | | | | |
|---|---|---|---|---|
| 10,875,532 | B2 * | 12/2020 | Matsunaga | G08G 1/166 |
| 11,069,223 | B2 * | 7/2021 | Sakabayashi | G08B 25/016 |
| 11,151,869 | B2 * | 10/2021 | Sayin | G08G 1/0145 |
| 11,819,305 | B1 * | 11/2023 | Volkerink | B32B 27/36 |
| 11,891,079 | B2 * | 2/2024 | Uenoyama | B60W 30/16 |
| 12,094,262 | B2 * | 9/2024 | Einecke | H04W 4/029 |
| 12,217,552 | B1 * | 2/2025 | Gammelgard | H04L 9/3236 |
| 12,244,974 | B1 * | 3/2025 | Buffett-Kennedy | G01S 17/89 |
| 12,277,207 | B2 * | 4/2025 | Bae | G06F 21/36 |
| 12,391,272 | B2 * | 8/2025 | Wan | B60W 30/0956 |
| 12,406,584 | B2 * | 9/2025 | Dewey | B62D 15/0265 |
| 2004/0077330 | A1 * | 4/2004 | Kusayanagi | G08G 1/161 |
| | | | | 455/404.1 |
| 2004/0166828 | A1 * | 8/2004 | Yosioka | G08B 25/016 |
| | | | | 455/344 |
| 2013/0190967 | A1 * | 7/2013 | Hassib | G07C 5/0816 |
| | | | | 701/31.5 |
| 2013/0289819 | A1 * | 10/2013 | Hassib | G07C 5/006 |
| | | | | 701/1 |
| 2016/0323921 | A1 * | 11/2016 | Thanayankizil | H04W 76/19 |
| 2017/0364069 | A1 * | 12/2017 | Colella | G08G 1/096783 |
| 2018/0011673 | A1 * | 1/2018 | Kim | H04M 1/72412 |
| 2018/0029553 | A1 * | 2/2018 | Hamakami | G08B 25/08 |
| 2018/0113450 | A1 * | 4/2018 | Sherony | B60W 30/18163 |
| 2018/0180432 | A1 * | 6/2018 | Surnilla | G08G 1/167 |
| 2018/0213597 | A1 * | 7/2018 | Hayama | G05D 1/104 |
| 2018/0238098 | A1 * | 8/2018 | Rhode | E05C 17/006 |
| 2018/0297543 | A1 * | 10/2018 | Loeffler | G07C 5/008 |
| 2018/0365909 | A1 * | 12/2018 | Cheng | H04Q 9/00 |
| 2018/0365911 | A1 * | 12/2018 | Raviram | G07C 5/0825 |
| 2019/0215342 | A1 * | 7/2019 | Eftekhari Roozbehani | |
| | | | | H04L 9/085 |
| 2019/0251847 | A1 * | 8/2019 | Wu | G08G 1/056 |
| 2019/0263401 | A1 * | 8/2019 | Yoo | B60W 60/0015 |
| 2019/0311404 | A1 * | 10/2019 | Wasserman | G08G 1/0175 |
| 2019/0361436 | A1 * | 11/2019 | Ueda | G08G 1/09 |
| 2020/0151943 | A1 * | 5/2020 | Navarrette | G02B 27/0101 |
| 2020/0262338 | A1 * | 8/2020 | Salter | B60R 1/12 |
| 2021/0132604 | A1 * | 5/2021 | Gillett | G05D 1/0016 |
| 2021/0200222 | A1 * | 7/2021 | Zhu | G08G 1/096775 |
| 2021/0362598 | A1 * | 11/2021 | Oh | G06Q 30/02 |
| 2022/0005354 | A1 * | 1/2022 | Baghel | G08G 1/162 |
| 2022/0116673 | A1 * | 4/2022 | Cho | G06Q 30/0265 |
| 2022/0129845 | A1 * | 4/2022 | Bae | G06Q 10/0833 |
| 2022/0268596 | A1 * | 8/2022 | Ariyoshi | G01C 21/3815 |
| 2022/0270177 | A1 * | 8/2022 | Chintakindi | H04W 4/029 |
| 2022/0300896 | A1 * | 9/2022 | Volkerink | G06K 19/0723 |
| 2023/0121388 | A1 * | 4/2023 | Khan | B60K 35/22 |
| | | | | 340/435 |
| 2023/0391371 | A1 * | 12/2023 | Donderici | B60W 60/0016 |
| 2023/0415753 | A1 * | 12/2023 | Zhou | G05B 17/02 |
| 2024/0217514 | A1 * | 7/2024 | Yamada | B60W 30/16 |
| 2024/0217548 | A1 * | 7/2024 | Pronovost | B60W 50/0097 |
| 2025/0054345 | A1 * | 2/2025 | Sharma | G07C 5/0825 |
| 2025/0287187 | A1 * | 9/2025 | Davis | G06V 20/56 |

* cited by examiner

300

SYSTEM AND METHOD FOR COMMUNICATING DRIVING INTENT OF AN AUTONOMOUS VEHICLE

TECHNICAL FIELD

The field of the disclosure relates generally to an on-vehicle radio system and, more specifically, to an on-vehicle radio system, such as a Wi-Fi system, for communication of information between an autonomous vehicle and other vehicles and/or users in the other vehicles.

BACKGROUND

When a non-autonomous vehicle needs to complete a driving event, such as changing a lane or exiting a highway, the driver of the non-autonomous vehicle uses a turn signal to indicate the driver's intention to make the lane change or highway exit. However, sometimes a situation arises in which the use of a turn signal to indicate a driver's intent to complete a driving event is not sufficient to enable the safe completion of the driving event. To ensure the safe completion of the driving event, indication of a driver's intent may be supplemented by eye contact or supplementary gestures to avoid an accident or dangerous situation. However, in a fully autonomous vehicle, turn signals are the only available means to communicate the vehicle's intent to complete a driving event such as a lane change or highway exit with other drivers on the road. In a fully autonomous vehicle, without a driver, it is not possible to provide personal, supplemental signals confirming intent, such as performing a gesture or making eye contact with drivers proximate the autonomous vehicle. Accordingly, there is a need for improvement in means for autonomous vehicles to communicate the vehicle's driving intent to other drivers on the road and enable the safe completion of the desired driving events by the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a vehicle including a vehicle wireless communication equipment, and an indicium for connecting to the vehicle wireless communication equipment is disclosed. The indicium is displayed on a body of the vehicle and the indicium includes information to connect with the vehicle wireless communication equipment. The vehicle wireless communication equipment is configured to broadcast a network identifier of the vehicle wireless communication equipment, and receive a request, from a third-party client device, to connect with the vehicle wireless communication equipment based upon the broadcasted network identifier or the indicium for connecting to the vehicle wireless communication equipment. The vehicle wireless communication equipment is configured to establish a session with the third-party client device in response to the received request, and transmit, to the third-party client device, infotainment information over the established session.

In another aspect, a method of transmitting infotainment information from a vehicle to a client device is disclosed. The method includes broadcasting a network identifier of a wireless communication equipment installed in the vehicle, and receiving a request, from the client device, to connect with the wireless communication equipment based upon the broadcasted network identifier or scanning of an indicium displayed on a body of the vehicle by the client device. The method includes, in response to receiving the request, establishing a session with the client device, and transmitting, to the client device, the infotainment information over the established session.

In yet another aspect, a vehicle including a vehicle wireless communication equipment is disclosed. The vehicle further includes an indicium for connecting to the vehicle wireless communication equipment. The indicium is displayed on a body of the vehicle and the indicium includes information to connect with the vehicle wireless communication equipment configured to: (i) broadcast a network identifier of the vehicle wireless communication equipment; (ii) receive a request, from a third-party client device, to connect with the vehicle wireless communication equipment based upon the broadcasted network identifier or the indicium for connecting to the vehicle wireless communication equipment; (iii) in response to the received request, establish a session with the third-party client device; and/or (iv) transmit, to the third-party client device, the vehicle's intent via the established session.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
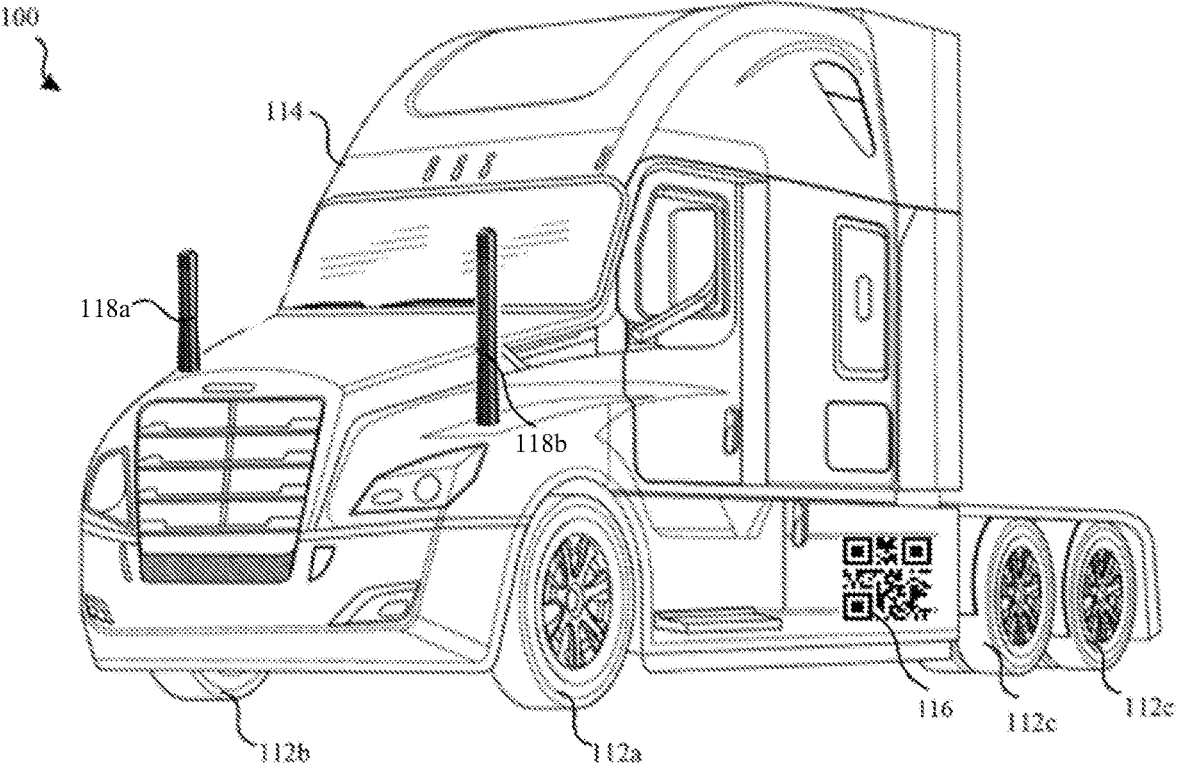
FIG. 1 is a schematic view of a vehicle such as a truck that includes an infotainment broadcast system of an exemplary embodiment of the present disclosure.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA. The semi-autonomous vehicle requires a human driver at all times for operating the semi-autonomous vehicle.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

A smart vehicle: A smart vehicle is a vehicle installed with on-board computing devices, one or more sensors, one or more controllers, and/or one or more internet-of-things (IoT) devices which enables the vehicle to receive and/or transmit data to another vehicle and/or a server.

Network identifier: A network identifier is an identifier of the on-vehicle radio system (also referenced herein as a wireless communication equipment). The network identifier may be a service set identifier (SSID), a particular frequency or a frequency band, a device name, etc., based on the wireless protocol being used by the wireless communication equipment.

Service Set Identifier (SSID): A SSID is a unique sequence of number and/or letters identifying a name of a Wi-Fi network to connect with the Wi-Fi network.

Infotainment: Infotainment referenced in the present disclosure refers to information including navigation information, traffic conditions, intent of changing a lane or exiting a highway, etc., and entertainment including streaming of music, movies, shows, news, games, puzzles, etc.

An infotainment broadcast system: An infotainment broadcast system is a wireless communication equipment. In one example, the wireless communication equipment may be a Wi-Fi Hotspot or a Wi-Fi network system broadcasting its service set identifier (SSID) and accepting connection requests from other user equipment and/or vehicles to establish a connection with the infotainment broadcast system to provide various media services including information corresponding to navigation path of the vehicle. In another example, the wireless communication equipment may be an amplitude-modulation (AM) radio, a frequency modulation (FM) radio, or a satellite radio broadcasting infotainment service. Thus, the infotainment broadcast system may support one-way transmission or broadcasting of infotainment services or two-way communication with other connected user equipment and/or vehicles.

As described in the present disclosure, when it is necessary for a non-autonomous vehicle to complete a driving event such as change a lane or exit a highway, a driver of the non-autonomous vehicle may use a turn signal to indicate the intention to change lanes to other drivers on the road. In addition to signaling the desire to change lanes, the driver of the non-autonomous vehicle may also make a supplemental gesture to other drivers such as eye contact or a hand signal (e.g., wave) to enable the safe completing of the lane change. However, when a vehicle is a fully autonomous vehicle and without a human driver, turn signals are the only available means to communicate with other drivers on the road. Various embodiments, as described herein, provide additional means to communicate an intent of the autonomous vehicle with other drivers on the road and other users of the roadway. Other users of the roadway may include pedestrians carrying mobile devices, smart vehicles, and/or static users. By way of a non-limiting example, the static users may be traffic monitoring stations, nearby train passengers, café or restaurant patrons, etc., that are being passed by the vehicle having a Wi-Fi hotspot or a Wi-Fi network system installed in the autonomous vehicle.

The Wi-Fi hotspot or the Wi-Fi network system, installed in the autonomous vehicle may be one example of the wireless communication equipment installed in the autonomous vehicle. The wireless communication equipment installed in the autonomous vehicle may be configured to establish a communication session with user equipment and/or smart vehicles using wireless protocols including, but not limited to, Wi-Fi, Bluetooth, 3G, 4G, LTE, 5G, 6G, etc. Additionally, or alternatively, the wireless communication equipment installed in the autonomous vehicle may communicate with user equipment and/or smart vehicles over AM radio, FM radio, or satellite radio. Various embodiments are described herein using the Wi-Fi hotspot or the Wi-Fi network system as the example wireless communication equipment; however, other types of wireless communication equipment may also be used. The Wi-Fi hotspot or the Wi-Fi network system may broadcast its SSID information so that other mobile devices (such as phones, tablets, laptops, IoT devices, or smart glasses) or smart vehicle may establish connections with the Wi-Fi hotspot, or the Wi-Fi network system installed in the autonomous vehicle.

While the Wi-Fi hotspot or the Wi-Fi network system installed in a vehicle is generally available to users inside the vehicle, and mainly for accessing internet via the Wi-Fi hotspot or the Wi-Fi network system, the Wi-Fi hotspot or the Wi-Fi network system installed in the autonomous vehicle may be configured or adapted to transmit an intent of the autonomous vehicle and/or a traffic condition to other drivers on the road and/or other users of the roadway. As described herein, the intent of the autonomous vehicle may generally comprise the need to complete a driving event and more specifically, the driving event may further comprise a lane change or highway exit. Exemplary traffic conditions that may be transmitted may comprise the current speed of the autonomous vehicle, the speeds of other vehicles ahead of the autonomous vehicle in the same lane, the distance between the autonomous vehicle and another vehicle ahead of the autonomous vehicle in the same lane, accidents, road closure, or road blockage conditions, etc. By communicating the intent of the autonomous vehicle or the traffic condition to other drivers on the road or other users of the roadway from the Wi-Fi hotspot or the Wi-Fi network system installed in the autonomous vehicle, courteous supplemental signaling is provided that enables the autonomous vehicle to safely execute the desired autonomous vehicle events. As a result, driver confidence in the safety of autonomous vehicle may be improved.

In some embodiments, in addition to using the Wi-Fi hotspot or the Wi-Fi network system broadcasting the SSID, to inform other drivers or roadway users of autonomous vehicle's intent, a machine-readable image, such as a quick response (QR) code or a barcode, may be provided on one or more sides of the autonomous vehicle as shown FIG. 1. By scanning the machine-readable image using a camera of a mobile device or a camera of a smart vehicle, the mobile device or smart vehicle is able to connect to the Wi-Fi hotspot or the Wi-Fi network system of the autonomous vehicle. Additionally, or alternatively, the autonomous vehicle may include a radio-frequency identification (RFID) system that may be used to transfer data required to connect to the Wi-Fi hotspot or the Wi-Fi network system of the autonomous vehicle to another RFID system. For example, the data may be transferred from the autonomous vehicle to an RFID system installed in a smart vehicle, or a mobile device of another driver or passenger in another vehicle on the road. In one example, the data may be transferred from the autonomous vehicle as a text message including an SSID of the Wi-Fi hotspot or the Wi-Fi network system of the autonomous vehicle.

By way of a non-limiting example, the Wi-Fi hotspot or the Wi-Fi network system of the autonomous vehicle may communicate the intent of the autonomous vehicle and/or the traffic condition to other mobile devices and/or smart vehicles connected with the Wi-Fi hotspot or the Wi-Fi network system of the autonomous vehicle. The intent of the autonomous vehicle or the traffic condition may be (periodically) communicated as data including text, an image, and/or a video. For example, a text message may be transmitted by the Wi-Fi hotspot or the Wi-Fi network system that describes the autonomous vehicle's intent to exit the highway or change the lane. By way of a non-limiting example, the text message on a display of the smart vehicle or the user equipment connected with the Wi-Fi hotspot, or the Wi-Fi network system may describe "The vehicle is exiting the highway at Exit 1." Additionally, or alternatively, an image illustrating the vehicle taking an exit, for example, Exit 1, may be transmitted from the Wi-Fi hotspot or the Wi-Fi network system to the smart vehicle or the user equipment for displaying on a display screen. In some embodiments, a video or a graphic interchange format (GIF) illustrating the vehicle exiting the highway at a specific exit may be transmitted from the Wi-Fi hotspot or the Wi-Fi network system to the smart vehicle or the user equipment for displaying on a display screen.

In some embodiments, a connection or a session established between the Wi-Fi network system or the Wi-Fi hotspot and the smart vehicle or the user equipment remains active as long as the smart vehicle or the user equipment is within Wi-Fi signal coverage of the Wi-Fi network system or the Wi-Fi hotspot. Additionally, or alternatively, the connection or the session established between the Wi-Fi network system or the Wi-Fi hotspot and the smart vehicle or the user equipment remains active for a predetermined time duration, such as 30 minutes, and when the smart vehicle or the user equipment leaves and then re-enters the Wi-Fi signal coverage of the Wi-Fi network system or the Wi-Fi hotspot within the predetermined time duration since the connection or the session first established, the Wi-Fi network system or the Wi-Fi hotspot may attempt to reestablish the connection or the session automatically.

In some embodiments, and by way of a non-limiting example, the text, image, and/or video transmitted from the Wi-Fi network system or the Wi-Fi hotspot to a smart vehicle or a user equipment connected with the Wi-Fi hotspot or the Wi-Fi network system may provide details of the traffic condition, and/or a specific driving path of the autonomous vehicle. In one example, the text may describe "There is a crash ahead causing about 10 minutes delay for the next 2 miles." In another example, the image and/or video transmitted by the Wi-Fi network system, or the Wi-Fi hotspot may be an image and/or a video taken by an imaging sensor such as a camera positioned in front of the autonomous vehicle. The data may be in a format that can be displayed to a user in a web browser-based application executing on a mobile device, and/or by a computing device (such as a controller of a smart vehicle) to take an action based on the received data. For example, if the text, image, and/or video received by the mobile device and/or by the computing device (such as the controller of the smart vehicle) indicates that the autonomous vehicle is taking an exit that is a half-mile away, the smart vehicle may alert a driver of the smart vehicle to slow down and allow the autonomous vehicle to change the lane to exit the highway. Similarly, the mobile device may display an alert or a notification on a display of the mobile device or on a display of a vehicle connected with the mobile device using Bluetooth or a wireless CarPlay protocol (for example, an Apple CarPlay or an Android Auto).

In some embodiments, the Wi-Fi hotspot, or the Wi-Fi network system of the autonomous vehicle of a fleet may broadcast fleet plans, or changes to the fleet plans, to devices that are connected with the Wi-Fi hotspot or the Wi-Fi network system of the autonomous vehicle. The fleet plans as described in the present disclosure may include anything related to fleet management, such as vehicles on the road, origination and destination of each vehicle in the fleet, scheduled timings to reach destinations, advance information regarding road conditions observed by the vehicles in the fleet, etc. When the Wi-Fi hotspot or the Wi-Fi network system is not broadcasting fleet plan, or the intent of the autonomous vehicle, the Wi-Fi hotspot or the Wi-Fi network system may broadcast infotainment to mobile devices and/or smart vehicles connected with the Wi-Fi hotspot or the Wi-Fi network system of the autonomous vehicle. By way of a non-limiting example, a schedule for broadcasting the fleet plan may be predetermined or may be updated based upon any change or an event observed by a network of sensors of the autonomous vehicle. Additionally, or alternatively, the schedule for infotainment broadcast may be as delivered by media broadcasting partners, media providers, advertisement broadcasting partners, advertisement providers.

While the intent of the autonomous vehicle and/or the traffic condition may be communicated as data without any charge to other mobile devices or smart vehicles, the Wi-Fi hotspot or the Wi-Fi network system may provide other services, for a fee, such as streaming of music, shows, news, and/or movies, on-demand services, and/or Internet access service. A user of the mobile device or a smart vehicle may select a plan from a number of plans to receive the other services, as described herein, for a specific time duration, a specific bandwidth, a specific data speed, or a specific service.

In some embodiments, and by way of a non-limiting example, the Wi-Fi network system or the Wi-Fi hotspot installed in the autonomous vehicle may collect traffic data, usage data such as number of mobile devices or smart vehicles connecting with the Wi-Fi network system or the Wi-Fi hotspot, or services subscribed by the mobile devices or the smart vehicles. The collected traffic data or usage data may be sent to a central hub or a mission control operating the specific autonomous vehicle for various purposes including, but not limited to, analysis of traffic conditions on a specific route, scheduling of fleet along the specific route, tailoring content streaming along the specific route/region.

Additionally, or alternatively, user identifying information may be removed for privacy before sending the collected traffic data and/or usage data to the central hub or mission control.

The Wi-Fi network system or the Wi-Fi hotspot system may be communicatively coupled with the central hub or the mission control over a 3G network, a 4G network, a 5G network, a 6G network, a WiMAX network, and/or a satellite network. Additionally, or alternatively, a public repeater infrastructure and/or a private repeater infrastructure may also be used by the Wi-Fi network system or the Wi-Fi hotspot system to connect with the central hub or the mission control.

While the Wi-Fi network system or the Wi-Fi hotspot system is described using an autonomous vehicle, the embodiments described herein may be applicable to a non-autonomous vehicle or a semi-autonomous vehicle. Various features or embodiments described above are discussed in more detail below with respect to FIGS. 1-3.

FIG. 1 illustrates a vehicle 100 which may include a truck that may further be conventionally connected to a single or tandem trailer to transport the trailers (not shown) to a desired location. The vehicle 100 includes a cab 114 that can be supported by, and steered in, the required direction by front wheels 112*a*, 112*b*, and rear wheels 112*c* that are partially shown in FIG. 1. Wheels 112*a*, 112*b* are positioned by a steering system that includes a steering wheel and a steering column (not shown in FIG. 1). The steering wheel and the steering column may be located in the interior of cab 114. The steering wheel and the steering column may be omitted in an autonomous vehicle. The Wi-Fi network system or the Wi-Fi hotspot system described in the present disclosure may be located in the interior of cab 114 (not shown in FIG. 1). One or more antennas 118*a*, 118*b* may be positioned on the cab 114. By way of a non-limiting example, the one or more antennas 118*a*, 118*b* may be omnidirectional antennas, directional antennas, and/or sector antennas. The one or more antennas 118*a*, 118*b* may be positioned on the roof of the cab 114, on the hood of the cab 114, or inside the cab 114 such that the mobile devices and/or smart vehicles surrounding the autonomous vehicle may be provided services through the Wi-Fi network system or the Wi-Fi hotspot system. A QR code 116 may be positioned on one or more sides of the vehicle 100, as shown in FIG. 1. Additionally, or alternatively, an SSID of the Wi-Fi network system or the Wi-Fi hotspot may also be provided on one or more sides of the vehicle 100, similar to the QR code 116. The QR code 116 and the SSID may be referenced herein as indicia for connecting to the Wi-Fi network system or the Wi-Fi hotspot system.

Figure 2:
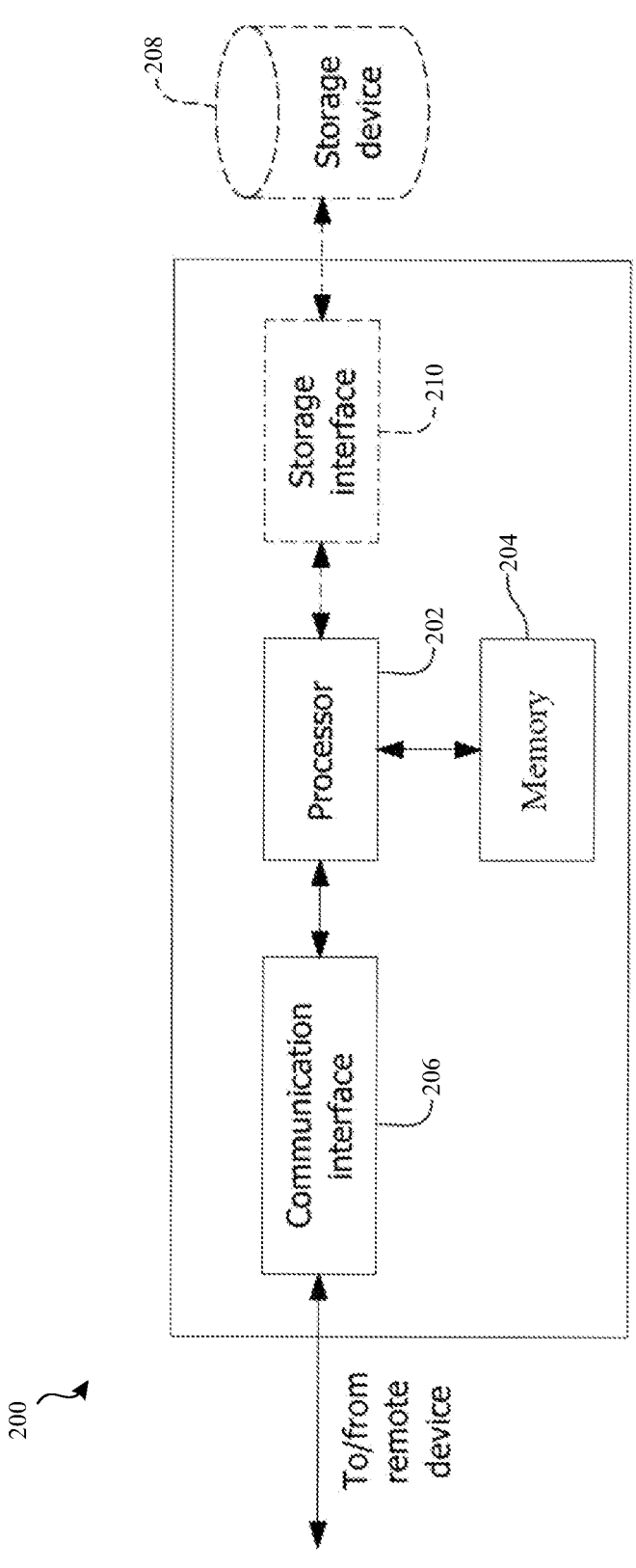
FIG. 2 is an exemplary schematic block diagram of a computing device for implementation of embodiments of the present disclosure.

FIG. 2 is an exemplary schematic block diagram of a computing device 200 for implementation of embodiments of the present disclosure. The computing device 200 may be the Wi-Fi network system and the Wi-Fi hotspot system described herein. The computing device 200 may include one or more processing units or processors 202 (e.g., in a multi-core configuration). Processor 202 may be operatively coupled to a communication interface 206 such that the computing device 200 is capable of communicating with another device, such as a remote application server, a user equipment, a mobile device, a smart vehicle, a mission control or a central hub, or another computing device, for example, using wireless communication or data transmission over one or more radio links or digital communication channels using one or more of a Wi-Fi protocol, an RFID protocol, or a Near-Field Communication (NFC) protocol, as one-way communication or two-way communication.

Processor 202 may also be operatively coupled to a storage device 208. Storage device 208 may be any computer-operated hardware suitable for storing or retrieving data, such as, but not limited to, data associated with historic databases. In some embodiments, storage device 208 may be integrated in the computing device 200. For example, the computing device 200 may include one or more hard disk drives as storage device 208.

In other embodiments, storage device 208 may be external to the computing device 200 and may be accessed by a using a storage interface 210. For example, storage device 208 may include a storage area network (SAN), a network attached storage (NAS) system, or multiple storage units such as hard disks or solid-state disks in a redundant array of inexpensive disks (RAID) configuration.

In some embodiments, processor 202 may be operatively coupled to storage device 208 via the storage interface 210. Storage interface 210 may be any component capable of providing processor 202 with access to storage device 208. Storage interface 210 may include, for example, an Advanced Technology Attachment (ATA) adapter, a Serial ATA (SATA) adapter, a Small Computer System Interface (SCSI) adapter, a RAID controller, a SAN adapter, a network adapter, or any component providing processor 202 with access to storage device 208.

The processor 202 may execute computer-executable instructions for implementing aspects of the disclosure. In some embodiments, the processor 202 may be transformed into a special purpose microprocessor by executing computer-executable instructions or by otherwise being programmed. In some embodiments, and by way of a non-limiting example, the memory 204 may include instructions to perform specific operations, as described herein.

Figure 3:
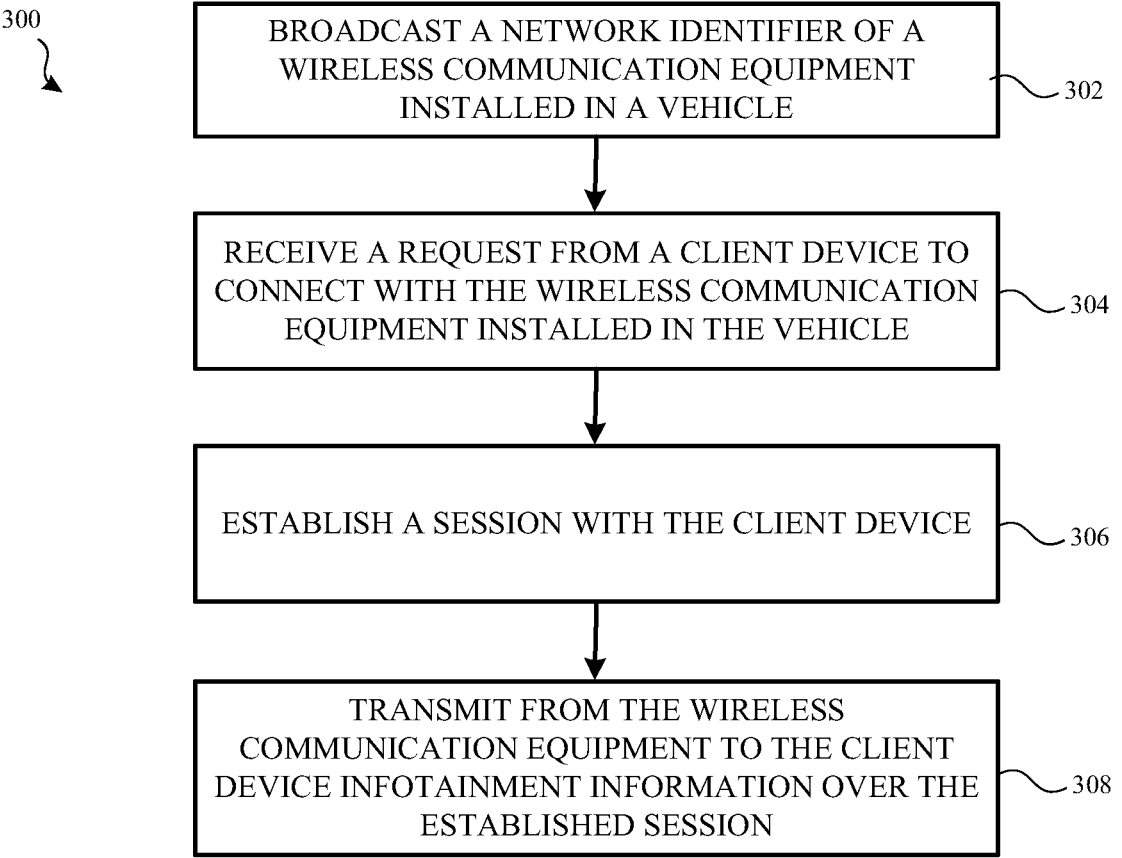
FIG. 3 is an exemplary flow chart of a method of transmitting infotainment information from a vehicle to a client device in accordance with embodiments of the present disclosure.

FIG. 3 is a flow chart that comprises an exemplary method 300 of transmitting infotainment information from a vehicle to a client device, which may also be referenced herein as a third-party client device, in accordance with embodiments of the present disclosure. By way of a non-limiting example, the client device or the third-party client device may be a Wi-Fi enabled client device. As shown in FIG. 3, and as described herein, a vehicle may broadcast 302 a network identifier of a wireless communication equipment installed in the vehicle. By way of a non-limiting example, the wireless communication equipment may be a Wi-Fi network system or a Wi-Fi hotspot system. The network identifier may be a name of the wireless communication equipment. In case the wireless communication equipment is the Wi-Fi network or the Wi-Fi hotspot system, the network identifier may be a service set identifier. The wireless communication equipment installed in the vehicle may also be referenced herein as the vehicle wireless communication equipment. The broadcasted network identifier may be received by the client device, and a user of the client device may initiate and transmit a request to connect with the wireless communication equipment. In some embodiments, the client device may automatically generate and transmit the request to connect with the wireless communication equipment.

The vehicle receives 304 the request transmitted from the client device, based on the broadcasted network identifier, or an indicium displayed on a body of the vehicle 100. By way of a non-limiting example, the indicium displayed on the body of the vehicle 100 may include a machine readable image, such as a QR code, a network identifier, or an SSID of the Wi-Fi network system or the Wi-Fi hotspot system. The machine readable image may be scanned by the client device. In response to receiving 304 the request, a session is established 306 between the wireless communication equipment and the client device. The infotainment information is transmitted 308 to the client device from the wireless communication equipment.

By way of a non-limiting example, the infotainment information may include at least one of: a current speed of the vehicle, a count of vehicles ahead of the vehicle in a traffic lane within a predetermined distance, a distance between the vehicle and another vehicle ahead of the vehicle in the traffic lane, or a speed of the other vehicle in the traffic lane. Additionally, or alternatively, the infotainment information may include an intent of the vehicle, e.g., changing a speed of the vehicle, taking an exit, or changing a traffic lane. The infotainment information may also include a fleet plan or a change in the fleet plan. In some examples, the infotainment information may include at least one of: a music streaming service, a movie streaming service, a news streaming service, an on-demand service, or an Internet access service. The infotainment information may be transmitted to the client device in accordance with a subscription plan purchased by a user of the client device.

The client device as described herein may include a user equipment, a mobile device, a tablet, a smartwatch, a laptop, a smart glass, an internet-of-things (IoT) device, or a smart vehicle. The vehicle may be an autonomous vehicle, a semi-autonomous vehicle, or a non-autonomous vehicle.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms such as processor, processing device, and related terms.

In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A vehicle, comprising:
a vehicle wireless communication equipment; and
an indicium for connecting to the vehicle wireless communication equipment, the indicium displayed on a body of the vehicle and the indicium including information to connect with the vehicle wireless communication equipment,
wherein:
the vehicle wireless communication equipment is configured to:
broadcast a network identifier of the vehicle wireless communication equipment;
receive a request, from a third-party client device, to connect with the vehicle wireless communication equipment based upon the broadcasted network identifier or the indicium for connecting to the vehicle wireless communication equipment;
in response to the received request, establish a session with the third-party client device; and
transmit, to the third-party client device, infotainment information over the established session.

2. The vehicle of claim 1, wherein the infotainment information includes at least one of: a current speed of the vehicle, a count of vehicles ahead of the vehicle in a traffic lane within a predetermined distance, a distance between the vehicle and another vehicle ahead of the vehicle in the traffic lane, or a speed of another vehicle in the traffic lane.

3. The vehicle of claim 1, wherein the infotainment information includes a driving intent of the vehicle.

4. The vehicle of claim 3, wherein the intent of the vehicle includes at least one of changing a speed of the vehicle, exiting a highway, or changing a traffic lane, and wherein the infotainment information includes a fleet plan or a change in the fleet plan.

5. The vehicle of claim 1, wherein infotainment information includes at least one of: a music streaming service, a movie streaming service, a news streaming service, an on-demand service, or an Internet access service.

6. The vehicle of claim 5, wherein the infotainment information is transmitted to a Wi-Fi enabled device in accordance with a subscription plan purchased by a user of the Wi-Fi enabled device.

7. The vehicle of claim 1, wherein the indicium for connecting to the vehicle wireless communication equipment displayed on the body of the vehicle includes a quick response (QR) code or the network identifier.

8. The vehicle of claim 1, wherein the vehicle is an autonomous vehicle, a semi-autonomous vehicle, or a non-autonomous vehicle.

9. A method of transmitting infotainment information from a vehicle to a client device, the method comprising:
broadcasting, by a wireless communication equipment, information to connect with the wireless communication equipment installed in the vehicle, the information including a network identifier and included in an indicium displayed on a body of the vehicle;
receiving, by the wireless communication equipment, a request, from the client device, to connect with the wireless communication equipment based upon the broadcasted network identifier or scanning of the indicium displayed on the body of the vehicle by the client device;
in response to receiving the request, establishing, by the wireless communication equipment, a session with the client device; and
transmitting, by the wireless communication equipment, to the client device, the infotainment information over the established session.

10. The method of claim 9, wherein the infotainment information includes at least one of: a current speed of the vehicle, a count of vehicles ahead of the vehicle in a traffic lane within a predetermined distance, a distance between the vehicle and another vehicle ahead of the vehicle in the traffic lane, or a speed of another vehicle in the traffic lane.

11. The method of claim 9, wherein the infotainment information includes communicating a driving intent of the vehicle.

12. The method of claim 11, wherein the intent of the vehicle includes at least one of changing a speed of the vehicle, exiting a highway, or changing a traffic lane.

13. The method of claim 9, wherein the infotainment information includes a fleet plan or a change in the fleet plan.

14. The method of claim 9, wherein the infotainment information includes at least one of: a music streaming service, a movie streaming service, a news streaming service, an on-demand service, or an Internet access service.

15. The method of claim 9, wherein the infotainment information is transmitted to the client device in accordance with a subscription plan purchased by a user of the client device.

16. The method of claim 9, wherein the indicium for connecting to the wireless communication equipment displayed on the body of the vehicle includes a quick response (QR) code or the network identifier.

17. The method of claim 9, wherein the vehicle is an autonomous vehicle, a semi-autonomous vehicle, or a non-autonomous vehicle.

18. A vehicle, comprising:
a vehicle wireless communication equipment; and an indicium for connecting to the vehicle wireless communication equipment, the indicium displayed on a body of the vehicle and the indicium including information to connect with the vehicle wireless communication equipment,
wherein: the vehicle wireless communication equipment is configured to:
broadcast a network identifier of the vehicle wireless communication equipment;
receive a request, from a third-party client device, to connect with the vehicle wireless communication equipment based upon the broadcasted network identifier or the indicium for connecting to the vehicle wireless communication equipment;
in response to the received request, establish a session with the third-party client device; and transmit, to the third-party client device, the vehicle's intent via the established session.

19. The vehicle of claim 18, wherein the vehicle's intent includes at least one of changing a speed of the vehicle, exiting a highway, or changing a traffic lane, and wherein the network identifier includes a service set identifier or a name of the vehicle wireless communication equipment.

20. The vehicle of claim 18, wherein vehicle wireless communication equipment is further configured to transmit, to the third-party client device, infotainment information over the established session, wherein the infotainment information includes at least one of: a current speed of the vehicle, a count of vehicles ahead of the vehicle in a traffic lane within a predetermined distance, a distance between the vehicle and another vehicle ahead of the vehicle in the traffic lane, or a speed of another vehicle in the traffic lane.

\* \* \* \* \*